(12) United States Patent
Lee et al.

(10) Patent No.: US 7,551,848 B2
(45) Date of Patent: Jun. 23, 2009

(54) PHOTOGRAPHIC LIGHT SYSTEM, IMAGING DEVICE AND METHOD FOR PROVIDING DIFFERENT TYPES OF PHOTOGRAPHIC LIGHT USING A SINGLE MULTIFUNCTIONAL LIGHT MODULE

(75) Inventors: Kian Shin Lee, Penang (MY); Janet Bee Yin Chua, Perak (MY); Chi Yuen Marcus Wong, Penang (MY)

(73) Assignee: Avago Technologies ECBU IP (Singapore) Pte. Ltd. (SG)

( * ) Notice: Subject to any disclaimer, the term of this patent is extended or adjusted under 35 U.S.C. 154(b) by 573 days.

(21) Appl. No.: 11/125,681

(22) Filed: May 10, 2005

(65) Prior Publication Data

US 2006/0257130 A1    Nov. 16, 2006

(51) Int. Cl.
*G03B 15/03* (2006.01)

(52) U.S. Cl. .......................... 396/157; 348/371

(58) Field of Classification Search ................. 396/155, 396/182, 225, 286, 157, 164; 348/223.1, 348/224.1, 225.1, 370, 371; 362/3, 4, 5, 362/11, 12, 16–18; 315/241 P; 250/332
See application file for complete search history.

(56) References Cited

U.S. PATENT DOCUMENTS

| | | | | |
|---|---|---|---|---|
| 4,295,717 A * | 10/1981 | Kitagawa | .................... | 396/203 |
| 5,530,512 A | 6/1996 | McIntyre | | |
| 5,870,636 A * | 2/1999 | Sugita et al. | ................. | 396/106 |
| 5,895,128 A * | 4/1999 | Kishimoto et al. | ............ | 396/61 |
| 7,221,864 B2 * | 5/2007 | Seo | .............................. | 396/176 |
| 7,318,651 B2 * | 1/2008 | Chua et al. | ..................... | 362/11 |
| 2002/0025157 A1 * | 2/2002 | Kawakami | .................. | 396/155 |
| 2004/0071458 A1 * | 4/2004 | Motomura | ................... | 396/159 |
| 2005/0030192 A1 * | 2/2005 | Weaver et al. | .......... | 340/815.45 |
| 2005/0063195 A1 * | 3/2005 | Kawakami | .................. | 362/545 |
| 2005/0134723 A1 * | 6/2005 | Lee et al. | ..................... | 348/370 |
| 2005/0148364 A1 * | 7/2005 | Yamashita | ................... | 455/557 |
| 2005/0174475 A1 * | 8/2005 | Yoshida | ....................... | 348/370 |
| 2005/0212684 A1 * | 9/2005 | Huang | .................... | 340/815.45 |
| 2006/0082679 A1 * | 4/2006 | Chua et al. | ................... | 348/371 |
| 2006/0139914 A1 * | 6/2006 | Yoganandan et al. | ......... | 362/227 |
| 2006/0176692 A1 * | 8/2006 | Lee et al. | ..................... | 362/231 |
| 2007/0096024 A1 * | 5/2007 | Furuya et al. | ................ | 250/332 |

FOREIGN PATENT DOCUMENTS

JP    08-136971    * 11/1994

OTHER PUBLICATIONS

Translation of JP Publication No. 08-136971 (Nov. 1994) provided.*

* cited by examiner

*Primary Examiner*—Christopher E Mahoney
*Assistant Examiner*—Fang-Chi Chang (57) ABSTRACT

A photographic light system, imaging device and method for providing different types of photographic light uses a single multifunctional light module to produce the different types of photographic light. The multifunctional light module includes a number of semiconductor light source devices, such as light emitting diodes (LED), which are controlled by a light module controller. The multifunctional light module can be used to produce an autofocus auxiliary light, a red-eye reducing light and a flash of light.

16 Claims, 4 Drawing Sheets

PHOTOGRAPHIC LIGHT SYSTEM, IMAGING DEVICE AND METHOD FOR PROVIDING DIFFERENT TYPES OF PHOTOGRAPHIC LIGHT USING A SINGLE MULTIFUNCTIONAL LIGHT MODULE

BACKGROUND OF THE INVENTION

In an imaging device, such as a digital still camera, different types of photographic light are needed during or prior to capturing an image of a scene of interest, such as a flash of light and an autofocus auxiliary light. Typically, separate lighting devices are used to provide these different types of photographic light. The most common lighting devices include electronic flashes and autofocus light devices.

Electronic flashes provide flashes of light to enhance images captured by a digital still camera or other imaging devices. Traditional electronic flashes utilize a bulb filled with gas, such as argon, krypton, neon and xenon, or vapor, such as mercury vapor. When a high voltage is applied to the bulb, the gas or vapor is ionized, allowing electrons to flow through the gas or vapor. These electrons excite the atoms of the gas or vapor, which emit light. The wavelength characteristics of the emitted light depends on the gas or vapor in the bulb. In the case of mercury vapor, the emitted light is ultraviolet light, which is usually converted to visible light using fluorescent material since ultraviolet light is typically not desired.

Recently, light emitting diode ("LEDs") have been improved to a point with respect to operating efficiency where LEDs are now replacing conventional light sources, even bulbs in electronic flashes. Existing LEDs can emit light in the ultraviolet ("UV"), visible or infrared ("IR") wavelength range. These LEDs generally have narrow emission spectrum (approximately +/−10 nm). As an example, a blue InGaN LED may generate light with wavelength of 470 nm +/−10 nm. As another example, a green InGaN LED may generate light with wavelength of 510 nm+/−10 nm. As another example, a red AlInGaP LED may generate light with wavelength of 630 nm+/−10 nm. However, since electronic flashes typically need to produce white light for color rendering purposes, different color LEDs such as red, blue and green LEDs are used together in an electronic flash to produce white light.

Autofocus light devices provide autofocus auxiliary light, which is a bright light with a narrow view angle. The autofocus auxiliary light is used measure the distance of a subject being photographed, such as a person, for autofocusing. Currently, many autofocus light devices in digital still cameras use an LED as the light source.

The electronic flash and the autofocus light device consume a significant amount of space in a digital still camera, especially in a compact digital still camera. Thus, the electronic flash and the autofocus light device hinder the development of a very compact digital still camera.

In view of this concern, there is a need for a system and method for providing different types of photographic light in an imaging device, such as a digital still camera, that does not require a significant amount of space in the imaging device.

SUMMARY OF THE INVENTION

A photographic light system, imaging device and method for providing different types of photographic light uses a single multifunctional light module to produce the different types of photographic light. The multifunctional light module includes a number of semiconductor light source devices, such as light emitting diodes (LED), which are controlled by a light module controller. The multifunctional light module can be used to produce an autofocus auxiliary light, a red-eye reducing light and a flash of light.

A photographic light system for providing different types of photographic light in accordance with an embodiment of the invention comprises a multifunctional light module including a plurality of semiconductor light source devices and a light module controller connected to the semiconductor light source devices of the multifunctional light module. The light module controller is configured to activate the semiconductor light source devices to produce a flash of light. The light module controller is further configured to selectively activate a portion of the semiconductor light source devices to produce an autofocus auxiliary light.

An imaging device in accordance with an embodiment of the invention comprises an image sensor configured to electronically capture an image of a scene of interest, a multifunctional light module including a plurality of semiconductor light source devices and a light module controller connected to the semiconductor light source devices of the multifunctional light module. The light module controller is configured to activate the semiconductor light source devices to produce a flash of light. The light module controller is further configured to selectively activate a portion of the semiconductor light source devices to produce an autofocus auxiliary light.

A method for providing different types of photographic light in accordance with an embodiment of the invention comprises providing a multifunctional light module including a plurality of semiconductor light source devices, selectively activating a portion of the semiconductor light source devices of the multifunctional light module to produce an autofocus auxiliary light and activating the semiconductor light source devices of the multifunctional light module to produce a flash of light.

Other aspects and advantages of the present invention will become apparent from the following detailed description, taken in conjunction with the accompanying drawings, illustrated by way of example of the principles of the invention.

DETAILED DESCRIPTION

Figure 1:
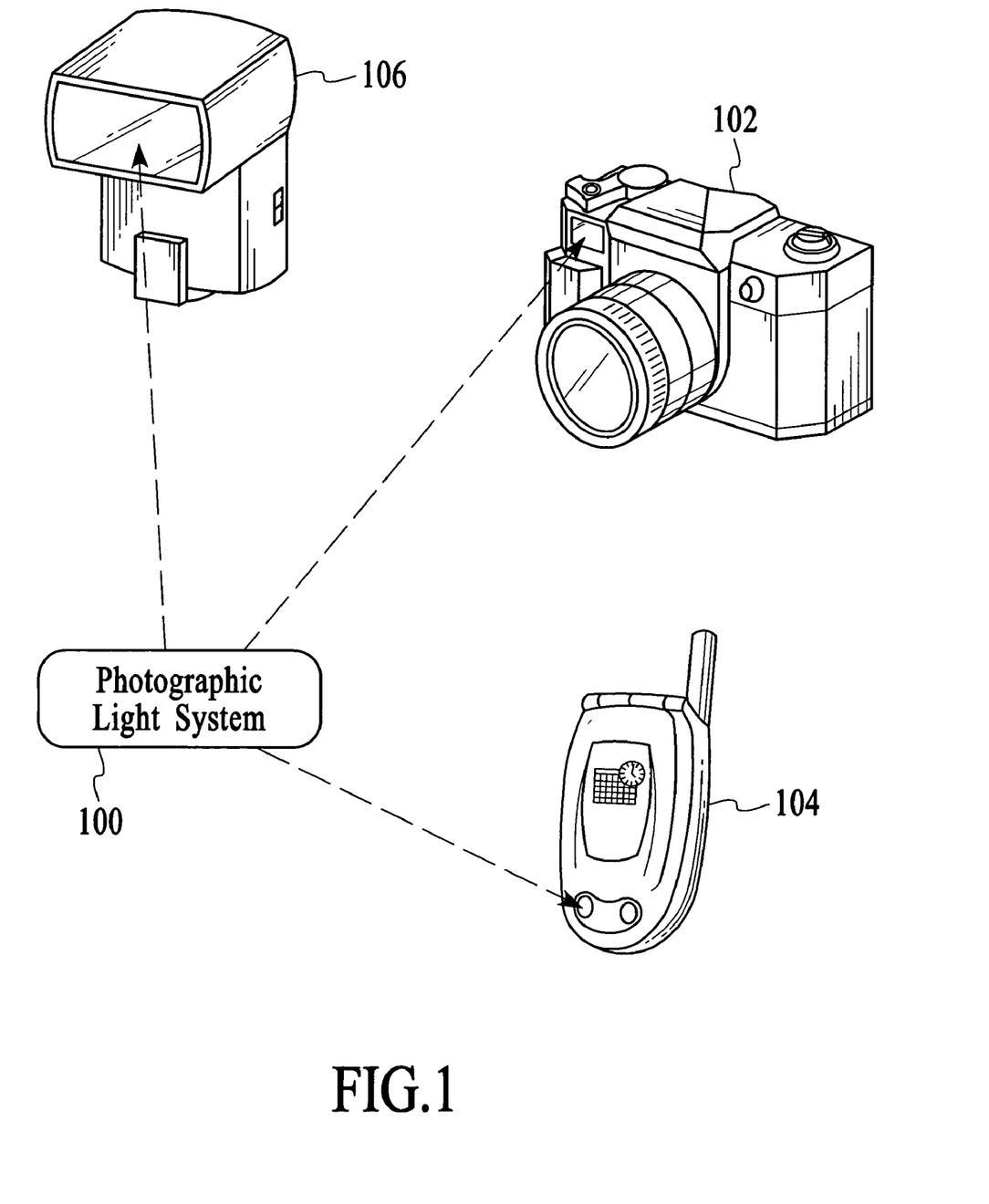
FIG. 1 shows a photographic light system in accordance with an embodiment of the invention, which may be included in an imaging device or an external flash unit.

With reference to FIG. 1, a photographic light system 100 for providing different types of photographic light in accordance with an embodiment of the invention is described. The photographic light system 100 uses a single multifunctional light module to provide various types of photographic light, such as a flash of light and an autofocus auxiliary light, whereas conventional light systems use multiple light devices to provide the different types of photographic light. As shown in FIG. 1, the photographic light system 100 may be included in a digital still camera 102, a camera phone 104 or any other imaging device capable of capturing an image of a scene of interest. The photographic light system 100 may also be included in an external flash unit 106 that can be used in connection with an imaging device. The external flash unit 106 may be designed to be attached an imaging device or to be used as an external device in connection with an imaging device. The photographic light system 100 is described in more detail below with reference to FIG. 2.

Figure 2:
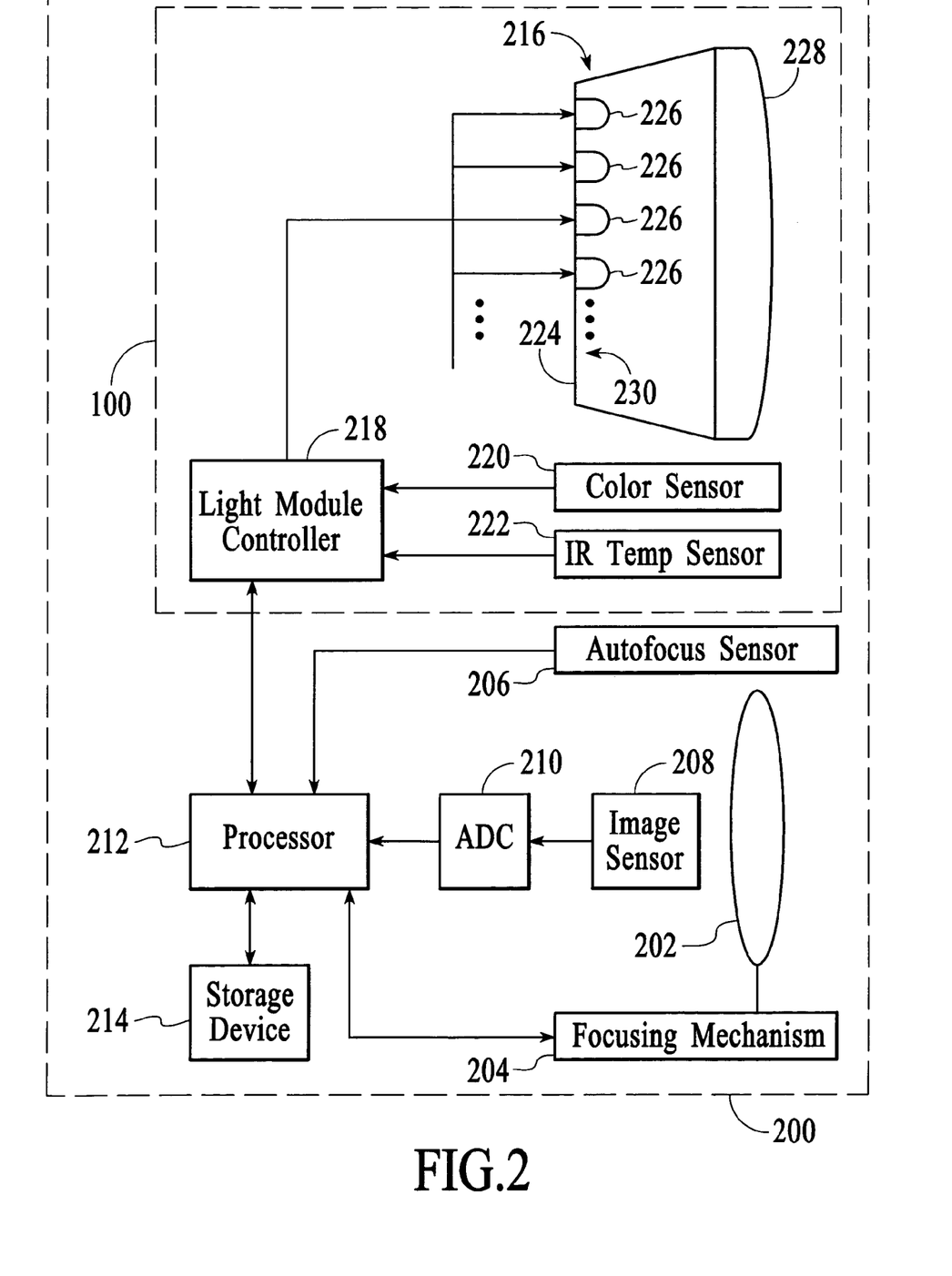
FIG. 2 is a block diagram of a digital imaging device with the photographic light system in accordance an embodiment of the invention.

In FIG. 2, a digital imaging device 200 with the photographic light system 100 in accordance an embodiment of the invention is shown. The imaging device 200 includes a lens 202, a focusing mechanism 204, an autofocus sensor 206, an image sensor 208, an analog-to-digital converter (ADC) 210, a processor 212, a storage device 214 and the photographic light system 100. The lens 202 is used to focus a scene of interest onto the image sensor 208 to capture an image of that scene. The focusing mechanism 204 operates to move the lens 202 to focus the lens with respect to the scene of interest. The focusing mechanism 204 can be controlled manually by a user or automatically by the processor 212. The autofocus sensor 206 is used to measure the distance between the imaging device 200 and a targeted subject in the scene of interest, e.g., a person, using the autofocus auxiliary light produced by the photographic light system 100, as described below. Although only a single autofocus sensor 206 is shown in FIG. 2, the imaging device 200 may include more than one autofocus sensor. The image sensor 208 is used to electronically capture an image of the scene of interest by generating an electrical charge at each pixel of the image sensor in response to received light at that pixel. As an example, the image sensor 208 may be a Charged Coupled Device (CCD) or a metal-oxide semiconductor (MOS) image sensor. The electrical charges generated by the image sensor 208 are converted to digital signals by the ADC 210 for signal processing.

The processor 212 of the imaging device 200 processes the digital signals from the ADC 210 to produce a digital image of the captured scene of interest. The processes performed by the processor 212 may include, for example, demosaicing, image enhancements and compression. The resulting digital image is stored in the storage device 214, which may include a removable memory card. The processor 212 also processes the signal from the autofocus sensor 206 to direct the focusing mechanism 204 to automatically focus the lens 202. Alternatively, the imaging device 200 may include a separate processor (not shown) to process the signal from the autofocus sensor 206. The processor 212 also controls the photographic light system 100, and other components of the imaging device that are commonly found in conventional digital cameras, which are not shown or described herein so that the inventive features of the imaging device are not obscured.

As shown in FIG. 2, the photographic light system 100 comprises a multifunctional light module 216, a light module controller 218, an optional color sensor 220 and an optional infrared (IR) temperature sensor 222. The multifunctional light module 216 includes a housing structure 224, a number of semiconductor light source devices 226 and an optically transparent cover 228. The housing structure 224 provides structural support for the semiconductor light source devices 226. The housing structure 224 may include a reflective internal surface 230 to reflect some of the light generated by the semiconductor light source devices 226 toward the optically transparent cover 228 so that most of the light generated by the light source devices can be transmitted through the cover as useful output light. The optically transparent cover 228 may be shaped as a lens to direct the light from the semiconductor light source devices 226 to optimize the output light of the multifunctional light module 216.

Figure 3:
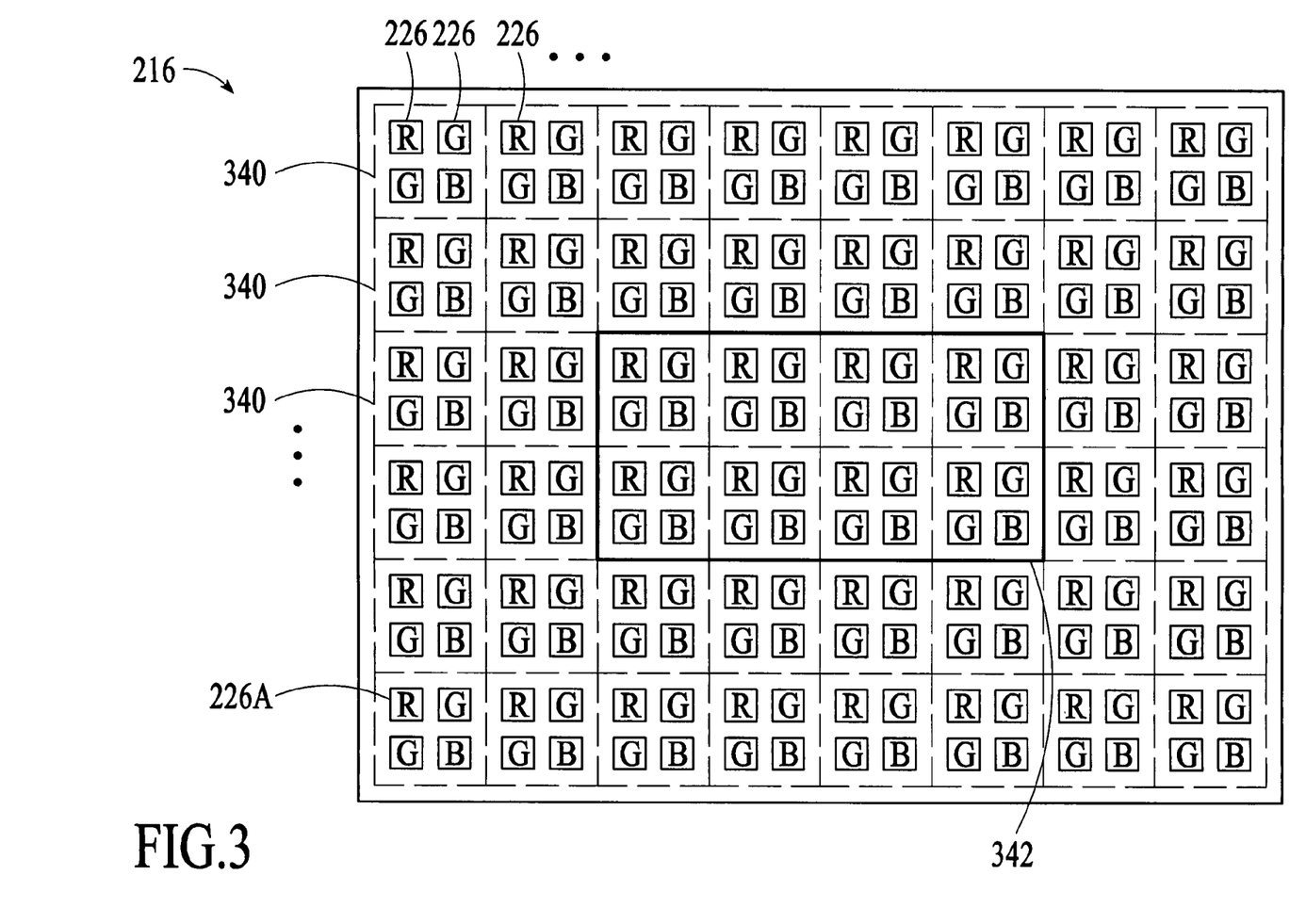
FIG. 3 shows semiconductor light source devices of the photographic light system in accordance with an embodiment of the invention.

The semiconductor light source devices 226 of the multifunctional light module 216 are mounted on the internal surface 230 of the housing structure 224, as illustrated in FIG. 2. The semiconductor light source devices 226 may be distributed to form an M×N array, where M and N are integers, as shown in FIG. 3. In an embodiment, the semiconductor light source devices 226 of the multifunctional light module 216 are light emitting diodes (LEDs), in particular red (R), green (G) and blue (B) LEDs. However, in other embodiments, the semiconductor light source devices 226 can be any type or types of devices that generate light, such as laser diodes. Furthermore, in other embodiments, the semiconductor light source devices 226 may include LEDs containing photoluminescent materials, such as phosphors. As shown in FIG. 3, the R, G and B LEDs 226 are distributed such that four LEDs are contained in a pixel region 340. Each pixel region 340 includes one R LED 226, one B LED 226 and two G LEDs 226. The number of pixel regions 340, and thus, the number of LEDs 226, included in the multifunctional light module 216 can be varied.

Turning back to FIG. 2, the light module controller 218 of the photographic light system 100 is connected to the multifunctional light module 216 to control the LEDs 226 of the light module. In particular, the light module controller 218 is electrically connected each LED 226 of the multifunctional light module 216. Thus, the light module controller 218 can selectively provide a driving current to the LEDs 226 of the multifunctional light module 216 to selectively activate some or all of the LEDs. Furthermore, the light module controller 218 can selectively provide different driving currents to the LEDs 226 of the multifunctional light module 216. Thus, the light module controller 218 can selectively control the brightness of each activated LED 226 of the multifunctional light module 216.

Since the light module controller 218 can control which LEDs 226 of the multifunctional light module 216 are activated and the brightness of the activated LEDs, the multifunctional light module can be used to produce different types of photographic light for various applications. The multifunctional light module 216 can be used as an electronic flash to produce a flash of light when capturing an image of a scene of interest. For this application, the light module controller 218 activates all or most of the LEDs 226 of the multifunctional light module 216 to produce a wide spread flash of light to enhance the lighting of the scene of interest being captured by the imaging device 200. The multifunctional light module 216 can also be used as an autofocus light device to produce an autofocus auxiliary light for autofocusing. For this application, the light module controller 218 activates only a portion of the LEDs 226 of the multifunctional light module 216, preferably using a higher driving current than the driving current used to produce a flash of light. As an example, only the LEDs 226 in a defined area 342, as shown in FIG. 3, may be activated to produce the autofocus auxiliary light using the higher driving current. Since the activated LEDs 226 are clustered in a relatively small area, the resulting light will have a narrower spread than the flash of light, but can be made to be much wider than the autofocus auxiliary light produced by conventional autofocus light devices. Furthermore, the autofocus auxiliary light produced by the multifunctional light module 216 can be made to be much brighter than the autofocus auxiliary light produced by the conventional autofocus light devices. In fact, the brightness of the autofocus auxiliary light produced by the multifunctional light module 216 may be controlled by varying (increasing or decreasing) the driving current supplied by the light module controller 218. The LEDs 226 of the multifunctional light module 216 used to produce an autofocus auxiliary light will be referred to herein as the "autofocus" LEDs.

The wavelength or color characteristics of the autofocus auxiliary light produced by the multifunctional light module 216 may also be controlled to enhance the performance of the autofocus operation of the imaging device 200. The autofocus sensor 206 of the imaging device 200 may have an optimal sensitiveness at a specific wavelength. Using the optional color sensor 220, the light module controller 218 can control the autofocus LEDs 226 of the multifunctional light module 216 to produce an autofocus auxiliary light having a peak wavelength at or near the specific wavelength of the autofocus sensor 206 so that the autofocus sensor can function more efficiently. The optional color sensor 220 is used to monitor the wavelength characteristics of the autofocus auxiliary light produced by the multifunctional light module 216. The optional color sensor 220 is connected to the light module controller 218 to transmit the wavelength characteristic information of the autofocus auxiliary light produced by the multifunctional light module 216. Using the information from the optional color sensor 220, the light module controller 218 can control the autofocus LEDs 226 of the multifunctional light module 216 so that the resulting autofocus auxiliary light can have the desired peak wavelength.

The color characteristics of the autofocus auxiliary light produced by the multifunctional light module 216 may also be controlled to enhance the mood of a person being photographed. Some people may feel more calm and comfortable after being exposed to certain color light, such as blue light. Since the autofocus auxiliary light is produced before a picture is captured, the autofocus auxiliary light may affect the mood of the person being photographed. Thus, using an autofocus auxiliary light of certain color, the person being photographed will be more emotionally stable when the picture is taken, which would be reflected in the captured image. The color of the autofocus auxiliary light can be controlled by the light module controller 218 by providing varying driving currents to the different autofocus R, G and B LEDs 226 of the multifunctional light module 216.

In an alternatively embodiment, the photographic light system 100 may further include an optional infrared (IR) temperature senor 222 connected to the light module controller 218. The IR temperature sensor 222 can be used to detect or measure the body temperature of a person being photographed. The color of the autofocus auxiliary light can then be adjusted in response to the detected body temperature of the person. When the IR temperature sensor 222 detects a high body temperature, the light module controller 218 controls the autofocus LEDs 226 of the multifunctional light module 216 so that the autofocus auxiliary light will have a "soft-color", e.g., blue. When the IR temperature sensor 222 detects a low body temperature, the light module controller 218 controls the autofocus LEDs 226 of the multifunctional light module 216 so that the autofocus auxiliary light will have a color that may excite the person being photographed, e.g., red, which may prevent the person looking pale in the captured image.

In addition to providing a flash of light and an autofocus auxiliary light, the multifunctional light module 216 can be used for self-timer display and red-eye reduction. In some still cameras, a blinking LED is used to display that a self-timer has been activated. This LED is another light device in addition to an electronic flash and an autofocus light device. Rather than using another light device, one or more LEDs 226 of the multifunctional light module 216 are selectively activated by the light module controller 218 to produce a blinking light when the self-timer feature of the imaging device 200 has been activated. As an example, the R LED 226A of the multifunctional light module 216 may be used as a self-timer light. The multifunctional light module 216 may also be used to generate a red-eye reducing light to reduce the red-eye effect in the captured image by allowing the irises of a person being photograph to close when the person is subsequently photographed with a flash of light. The red-eye reducing light may be generated for approximately one second using a portion of the LEDs 226 of the multifunctional light module 216 until the multifunctional light module produces a flash of light to capture an image of a scene of interest. Alternatively, the red-eye reducing light may be generated using a low driving current on all or most of the LEDs 226 of the multifunctional light module 216.

Figure 4:
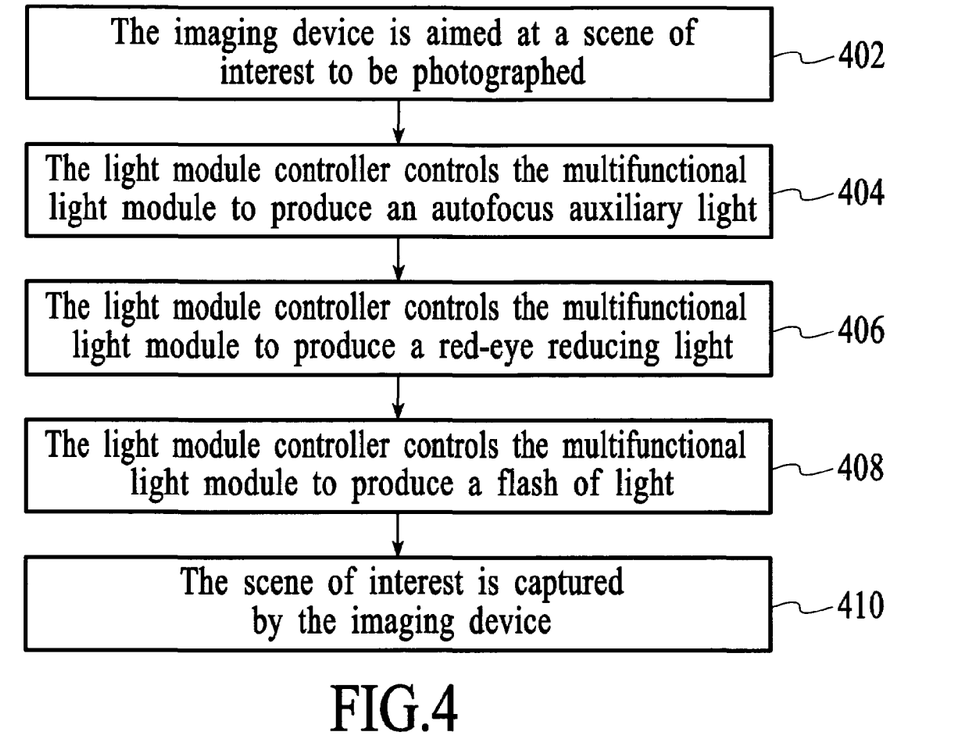
FIG. 4 is a flow diagram of an imaging capturing operation of the imaging device of FIG. 2 in accordance with an embodiment of the invention.

The image capturing operation of the imaging device 200 in accordance with an embodiment of the invention is described with reference to the flow diagram of FIG. 4. In this description, the autofocus, red-eye reduction and flash features of the imaging device 200 are assumed to have been enabled either manually by the user or automatically as a default setting. At step 402, the imaging device 200 is aimed at a scene of interest to be photographed, such as a scene with a person. Next, at step 404, the light module controller 218 controls the multifunctional light module 216 to produce an autofocus auxiliary light. The autofocus auxiliary light is produced by selectively transmitting a driving current to each autofocus LED 226 of the multifunctional light module 216, such as the LEDs 226 in the defined area 342, as illustrated in FIG. 3. The driving current applied to each autofocus LED 226 of the multifunctional light module 216 is preferably a higher current than the driving current used to produce a flash of light so that the light module produces a bright autofocus auxiliary light to ensure proper autofocusing operation.

In an embodiment, the peak wavelength of the autofocus auxiliary light may be adjusted by the light module controller 218 using the optional color sensor 220 to substantially match the optimal response wavelength of the autofocus sensor 206. In other embodiments, the color of the autofocus auxiliary light may be adjusted to a predefined color or a manually set color to affect the emotional state of the person being photographed so that the person appears well in the captured image. In one embodiment, the color of the autofocus auxiliary light may be adjusted to a color that has a calming effect, such as blue or a favorite color of the person being photographed. In another embodiment, the color of the autofocus auxiliary light is adjusted in response to the body temperature of the person being photographed. The body temperature of the person being photographed may be detected using the optional IR temperature sensor 222 so that the color of the autofocus auxiliary light can be adjusted accordingly. If the body temperature of the person is high, then the color of the autofocus auxiliary light is adjusted to a "soft color", such as blue. However, if the body temperature of the person is low, then the color of the autofocus auxiliary light is adjusted to a color that may excite the person, such as red.

Next, at block 406, the light module controller 218 controls the multifunctional light module 216 to produce a red-eye reducing light. The red-eye reducing light is used to reduce the red-eye effect in the captured image. The red-eye reducing light may be produced using one or more selected LEDs 226 of the multifunctional light module 216.

Next, at block 408, the light module controller 218 controls the multifunctional light module to produce a flash of light. The flash of light is used to provide external lighting when the scene of interest is being captured by the imaging device 200, at block 410. The process of capturing an image of a scene of interest has been described above, and thus, will not be repeated here.

Figure 5:
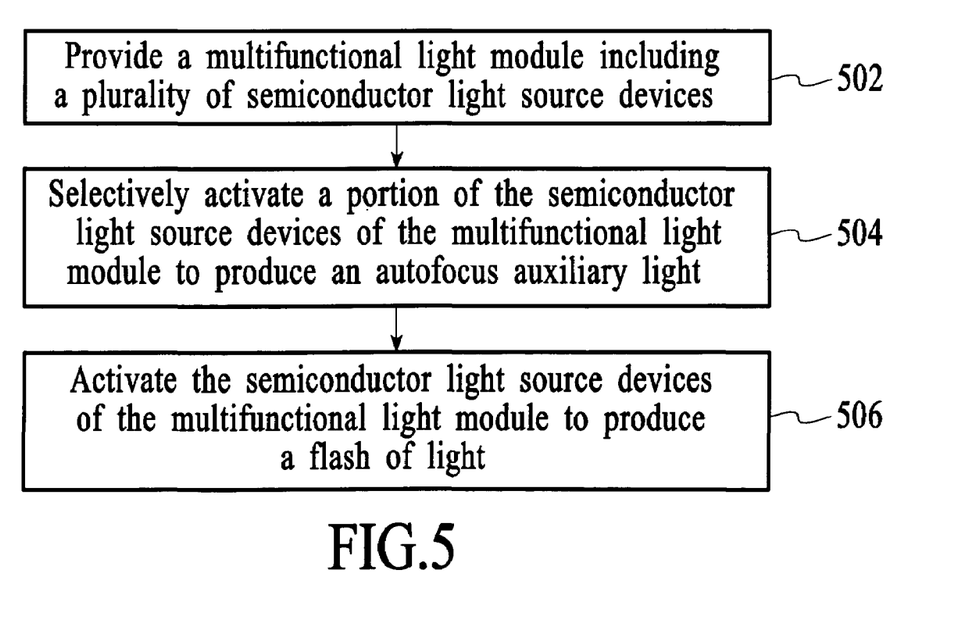
FIG. 5 is a flow diagram of a method for providing different types of photographic light in accordance with an embodiment of the invention.

A method for providing different types of photographic light in accordance with an embodiment of the invention is described with reference to the flow diagram of FIG. 5. At block 502, a multifunctional light module is provided. The multifunctional light module includes a number of semiconductor light source devices, such as LEDs of different colors. Next, at block 504, a portion of the semiconductor light sources of the multifunctional light module is selectively activated to produce an autofocus auxiliary light. Next, at block 506, the semiconductor light source devices of the multifunctional light module are activated to produce a flash of light.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A photographic light system for providing different types of photographic light, said system comprising:
   a multifunctional light module including a plurality of semiconductor light source devices;
   a light module controller connected to said semiconductor light source devices of said multifunctional light module, said light module controller being configured to activate all of said semiconductor light source devices to produce a flash of light, said light module controller further being configured to selectively activate only a portion of said semiconductor light source devices that are clustered in a defined area to produce an autofocus auxiliary light; and
   a temperature sensor operatively connected to said light module controller, said temperature sensor being configured to detect the body temperature of a subject in a scene of interest so that the color of an output light produced by said multifunctional light module can be adjusted by said light module controller, said light module controller being configured to adjust said color of said output light to blue if said body temperature of said subject is at one level and to adjust said color of said output light to red if said body temperature of said subject is at another level.

2. The system of claim 1 wherein said semiconductor light source devices of said multifunctional light module include light emitting diodes.

3. The system of claim 2 wherein said semiconductor light source devices of said multifunctional light module include red, green and blue light emitting diodes.

4. The system of claim 3 wherein said light module controller is configured to selectively provide different driving currents to said semiconductor light source devices of said multifunctional light module to control the color of said autofocus auxiliary light.

5. The system of claim 1 further comprising a color sensor operatively connected to said light module controller, said color sensor being configured to monitor wavelength characteristics of an output light produced by said multifunctional light module so that said wavelength characteristics of said output light can be adjusted by said light module controller.

6. The system of claim 1 wherein said light module controller is configured to selectively activate one or more of said semiconductor light source devices of said multifunctional light module to produce a blinking tight to indicate that a self-timer feature has been activated.

7. An imaging device comprising:
   an image sensor configured to electronically capture an image of a scene of interest;
   a multifunctional light module including a plurality of semiconductor light source devices;
   a light module controller connected to said semiconductor light source devices of said multifunctional light module, said light module controller being configured to activate all of said semiconductor light source devices to produce a flash of light, said light module controller further being configured to selectively activate only a portion of said semiconductor light source devices that are clustered in a defined area to produce an autofocus auxiliary light; and
   a temperature sensor operatively connected to said light module controller, said temperature sensor being configured to detect the body temperature of a subject in said scene of interest so that the color of an output tight produced by said multifunctional light module can be adjusted by said light module controller, said light module controller being configured to adjust said color of said output light to blue if said body temperature of said subject is at one level and to adjust said color of said output light to red if said body temperature of said subject is at another level.

8. The device of claim 7 wherein said semiconductor tight source devices of said multifunctional light module include tight emitting diodes.

9. The device of claim 8 wherein said semiconductor light source devices of said multifunctional light module include red, green and blue light emitting diodes.

10. The device of claim 9 wherein said tight module controller is configured to selectively provide different driving currents to said semiconductor light source devices of said multifunctional light module to control the color of said autofocus auxiliary light.

11. The device of claim 7 further comprising a color sensor operatively connected to said light module controller, said color sensor being configured to monitor wavelength characteristics of an output light produced by said multifunctional light module so that said wavelength characteristics of said output light can be adjusted by said light module controller.

12. The device of claim 7 wherein said light module controller is configured to selectively activate one or more of said semiconductor light source devices of said multifunctional light module to produce a blinking tight to indicate that a self-timer feature has been activated.

13. A method for providing different types of photographic light, said method comprising:
   providing a multifunctional light module, said multifunctional light module including a plurality of semiconductor light source devices;
   selectively activating only a portion of said semiconductor light source devices of said multifunctional light module that are clustered in a defined area to produce an autofocus auxiliary light, wherein said selectively activating includes providing different driving currents to said portion of said semiconductor light source devices of said multifunctional light module to adjust said autofocus auxiliary light to a desired color;
   activating all of said semiconductor light source devices of said multifunctional light module to produce a flash of light; and
   sensing the body temperature of a subject in a scene of interest so that said autofocus auxiliary light is adjusted to said desired color in response to said body temperature of said subject, wherein said autofocus auxiliary light is adjusted to blue if said body temperature of said subject is at one level and said autofocus auxiliary light is adjusted to red if said body temperature of said subject is at another level.

14. The method of claim 13 wherein said semiconductor light source devices of said multifunctional light module include red, green and blue light emitting diodes.

15. The method of claim 13 further comprising monitoring the color of said autofocus auxiliary light to determine whether said color substantially matches said desired color.

16. The method of claim 13 further comprising selectively activating one or more of said semiconductor light source devices of said multifunctional light module to produce a blinking light to indicate that a self-timer feature has been activated.

* * * * *

UNITED STATES PATENT AND TRADEMARK OFFICE
CERTIFICATE OF CORRECTION

PATENT NO. : 7,551,848 B2
APPLICATION NO. : 11/125681
DATED : June 23, 2009
INVENTOR(S) : Kian Shin Lee et al.

It is certified that error appears in the above-identified patent and that said Letters Patent is hereby corrected as shown below:

Column 8, Line 1, Claim 6, delete "tight" and insert --light--.

Column 8, Line 20, Claim 7, delete "tight" and insert --light--.

Column 8, Line 28, Claim 8, delete "tight" and insert --light--.

Column 8, Line 30, Claim 8, delete "tight" and insert --light--.

Column 8, Line 34, Claim 10, delete "tight" and insert --light--.

Column 8, Line 48, Claim 12, delete "tight" and insert --light--.

Signed and Sealed this
Twenty-fifth Day of September, 2012

David J. Kappos
*Director of the United States Patent and Trademark Office*